United States Patent
Frank et al.

(10) Patent No.: US 9,909,567 B2
(45) Date of Patent: Mar. 6, 2018

(54) ARRANGEMENT FOR MOUNTING COUNTER-ROTATABLE PARTS OF AN ENERGY SYSTEM

(71) Applicant: IMO Holding GmbH, Gremsdorf (DE)

(72) Inventors: Hubertus Frank, Höchstadt (DE); Erich Russ, Gremsdorf (DE); Volker Dietz, Neustadt a.d. Aisch (DE)

(73) Assignee: IMO Holding GmbH, Gremsdorf (DE)

( * ) Notice: Subject to any disclaimer, the term of this patent is extended or adjusted under 35 U.S.C. 154(b) by 467 days.

(21) Appl. No.: 14/377,247

(22) PCT Filed: Feb. 7, 2013

(86) PCT No.: PCT/IB2013/000154
§ 371 (c)(1),
(2) Date: Oct. 13, 2015

(87) PCT Pub. No.: WO2013/117980
PCT Pub. Date: Aug. 15, 2013

(65) Prior Publication Data
US 2016/0025068 A1    Jan. 28, 2016

(30) Foreign Application Priority Data

Feb. 7, 2012  (DE) .................. 10 2012 002 201
Mar. 7, 2012  (DE) .................. 10 2012 004 329

(51) Int. Cl.
*F16C 19/54* (2006.01)
*F03D 11/00* (2006.01)
(Continued)

(52) U.S. Cl.
CPC .......... *F03D 11/0008* (2013.01); *F03D 80/70* (2016.05); *F16C 19/188* (2013.01);
(Continued)

(58) Field of Classification Search
CPC ...... F16C 19/49; F16C 19/492; F16C 19/495; F16C 19/497; F16C 19/545; F16C 19/547;
(Continued)

(56) References Cited

U.S. PATENT DOCUMENTS 3,652,141 A * 3/1972 Husten .................... F16C 19/30
384/455
4,422,697 A  12/1983 Gugel et al.
(Continued)

FOREIGN PATENT DOCUMENTS

DE  1202617 B * 10/1965 ............. B23Q 1/265
DE  1976014    12/1967
(Continued)

*Primary Examiner* — Phillip A Johnson
(74) *Attorney, Agent, or Firm* — Pandiscio & Pandiscio

(57) ABSTRACT

The invention relates to a rolling bearing arrangement (1, 26, 31, 34, 36, 37), preferably a large rolling bearing with a diameter of 0.5 or more, for mounting parts of an energy system, in particular as blade bearings for a wind turbine, comprising at least two relatively rotatable annular elements (2, 3) arranged concentrically with one another and at least regionally inside one another, for connection to relatively rotatable parts of the energy system, wherein two relatively rotatable connecting elements (2, 3) are separated from each other by a gap (4) and at least partially overlap each other in the radial direction, wherein, further, provided in the region of the gap (4) in radially overlapping regions of the annular connecting elements (2, 3) are at least two rows of rolling elements (17, 18), each of which rolls along a respective two raceways (19, 20) that overlap each other at least regionally in the radial direction, wherein one or more raceways (19, 20) for rolling elements (17, 18) are disposed in radially overlapping sections (5, 6) in such fashion that the contact angle which the connecting line between the centers of the points of contact of a rolling element (17, 18) with its two (Continued)

raceways makes with the ring plane is equal to or greater than 45°, such that such an axial rolling bearing serves to transmit predominantly axially acting force components, and wherein at least one additional bearing is provided for transmitting predominantly radially acting force components and has a contact angle of less than 45°, preferably 25° or less, particularly 10° or less, wherein any raceways for radial rolling bearings that are incorporated directly into the annular connecting elements (2, 3) are, at most, ones having a maximum distance between them, perpendicular to the raceway surface, that is equal to or less than 25% of the largest distance perpendicular to the raceway surface between two raceways of an axial rolling-bearing row.

31 Claims, 13 Drawing Sheets

(51) Int. Cl.
| | |
|---|---|
| *F16C 19/18* | (2006.01) |
| *F16C 19/49* | (2006.01) |
| *F16C 21/00* | (2006.01) |
| *F16C 19/50* | (2006.01) |
| *F03D 80/70* | (2016.01) |

(52) U.S. Cl.
CPC ............ *F16C 19/49* (2013.01); *F16C 19/505* (2013.01); *F16C 19/545* (2013.01); *F16C 21/00* (2013.01); *F16C 2300/14* (2013.01); *F16C 2360/31* (2013.01)

(58) Field of Classification Search
CPC ........ F16C 19/548; F16C 19/56; F16C 33/61; F16C 2300/14; F16C 2360/31
See application file for complete search history.

(56) References Cited

U.S. PATENT DOCUMENTS

| | | |
|---|---|---|
| 5,134,863 A | 8/1992 | Hanna |
| 5,714,818 A | 2/1998 | Eakman et al. |
| 2009/0175724 A1* | 7/2009 | Russ ................. F03D 1/0658 416/131 |
| 2010/0067838 A1* | 3/2010 | Frank ................. F16C 19/18 384/477 |
| 2011/0115233 A1 | 5/2011 | Schröppel |
| 2012/0020792 A1* | 1/2012 | Frank ................. F03D 7/0204 416/169 R |
| 2012/0243819 A1* | 9/2012 | Errard ................. F16C 19/163 384/608 |

FOREIGN PATENT DOCUMENTS

| | | | |
|---|---|---|---|
| DE | 3905986 C1 * | 7/1990 | ............ F16C 19/166 |
| DE | 102007019482 A1 * | 11/2008 | ............ F16C 19/49 |
| DE | 102008009740 A1 * | 8/2009 | ............ F03D 7/0224 |
| DE | 102008049812 A1 * | 4/2010 | ............ F16C 19/381 |
| EP | 1239171 | 9/2002 | |
| EP | 1266137 | 8/2004 | |
| EP | 1741940 | 1/2007 | |
| EP | 2087249 | 7/2011 | |
| EP | 2372149 | 10/2011 | |
| EP | 2382146 | 10/2012 | |
| WO | WO 2010009793 A1 * | 1/2010 | ............ F16C 19/381 |

* cited by examiner

ARRANGEMENT FOR MOUNTING COUNTER-ROTATABLE PARTS OF AN ENERGY SYSTEM

REFERENCE TO PENDING PRIOR PATENT APPLICATION

This patent application claims benefit of International (PCT) Patent Application No. PCT/IB2013/000154, filed 7 Feb. 2013 by IMO Holding GmbH for ARRANGEMENT FOR MOUNTING COUNTER-ROTATABLE PARTS OF AN ENERGY SYSTEM, which claims benefit of German Patent Application No. 10 2012 002 201.8, filed 7 Feb. 2012 and German Patent Application No. 10 2012 004 329.5, filed 7 Mar. 2012, which patent applications are hereby incorporated herein by reference.

FIELD OF THE INVENTION

The present invention is directed to a rolling bearing arrangement, preferably a large rolling bearing with a diameter of 0.5 m or more, for mounting relatively rotatable parts of an energy system, particularly as a blade bearing of a wind power plant, comprising at least two relatively rotatable annular connecting elements arranged concentrically with one another and at least regionally inside one another, for connection to relatively rotatable parts of the wind power plant, wherein two relatively rotatable connecting elements are separated from each other by a gap and at least partially overlap each other in the radial direction, wherein, further, provided in the region of the gap in radially overlapping regions of the annular connecting elements are at least two rows of rolling elements, each of which rolls along a respective two raceways that overlap each other at least regionally in the radial direction, wherein one or more raceways for rolling elements are disposed in radially overlapping sections in such fashion that the contact angle which the connecting line between the centers of the points of contact of a rolling element with its two raceways makes with the ring plane is equal to or greater than 45°, with the result that such an axial rolling bearing serves to transmit predominantly axially acting force components, and wherein at least one additional bearing is provided for transmitting predominantly radially acting force components and has a contact angle of less than 45°, preferably 25° or less, particularly 10° or less. In the context of this system, the terms "wind power plant" and "wind energy system" are used synonymously and both pertain to a system for extracting usable energy from wind.

BACKGROUND OF THE INVENTION

In the prior art, large rolling bearings are known that comprise two mutually axially offset rows of rolling elements with a contact angle of 45° or more and, disposed between them, an additional row of rolling elements with a contact angle of less than 45°. Such an arrangement has proven very robust in practice, but the process of assembling a rolling bearing equipped with a total of at least three rows of rolling elements does present problems. This relates not only to the expenditure required to insert the rolling elements, but also particularly to the need for precision in the machining of the necessary raceways, which are usually incorporated directly into the connecting elements.

Arrangements for mounting relatively rotatable parts for use in blade bearings of wind power plants or wind energy systems according to the current state of the art are described, for example, in the patent documents EP 1 266 137 B1, EP 2 382 146 B1, EP 2372149 A1 and EP 2087249 B1.

Although the current-art arrangements described in those documents for mounting relatively rotatable parts for use in blade bearings of wind power plants or wind energy systems do basically fulfill the technical task, there is need for improvement, primarily in order to increase the service life of bearing arrangements that are used particularly as blade bearings, or, for example, also in similarly constructed water power systems, for example in the field of marine current power stations. Under some circumstances, it would be desirable to create rolling bearings that permit the least possible gap widening. This is because, precisely in the case of heavily loaded bearings, the rolling elements rolling inside a gap are elastically deformable under pressure and may not be able to fully perform their task of precisely orienting and positioning the supported parts with respect to one another.

From the disadvantages of the described prior art comes the problem initiating the invention, to further develop a rolling bearing arrangement of the above species in such a way that optimal robustness properties are combined with the longest possible service life and the lowest possible assembly expenditure.

SUMMARY OF THE INVENTION

This problem is solved by the fact that any raceways for radial rolling bearings that are incorporated directly into the annular connecting elements are, at most, ones having a maximum distance between them, perpendicular to the raceway surface, that is equal to or less than 25% of the largest distance perpendicular to the raceway surface between two raceways of one axial rolling-bearing row, preferably equal to or less than 20% of the largest distance perpendicular to the raceway surface between two raceways of one axial rolling-bearing row.

This can be achieved, in the context of a first embodiment, by having both connecting rings be completely free of incorporated raceways for a radial rolling bearing.

A step is thereby eliminated from the assembly process, i.e., that of incorporating a raceway for a radial rolling bearing into a gap surface. If a rolling bearing with a predominantly radial contact angle must still be provided, then the raceways for this purpose can, if necessary, be introduced in the form of prefabricated bearing shells or wire races.

Another method is to still equip the connecting rings with directly incorporated raceways for a radial rolling bearing, but to design them so that their maximum distance perpendicular to the raceway surface is equal to or less than 25% of the greatest distance perpendicular to the raceway surface between two raceways of one axial rolling-bearing row, preferably equal to or less than 20% of the greatest distance perpendicular to the raceway surface between two raceways of one axial rolling-bearing row.

Thus, a radial bearing can, in fact, be implemented as a rolling bearing; however, the rolling elements themselves that are used for the radial bearing are slenderer in this case—in terms of their maximum radius, referred to their axis of rotation—than the rolling elements used for the axial bearing. This, in turn, has the effect of improving the rigidity of such rolling bearings, so there is little risk of deformation in a bearing of this kind.

Moreover, the arrangement according to the invention for mounting relatively rotatable parts of an energy system is particularly advantageous especially as a rolling bearing arrangement for use in large wind power plants of 2 MW or more or for use as a rolling bearing with a diameter of 0.5 m or more, since greater loads can be absorbed by means of the inventive arrangement and the resulting expansion of the rolling-element rings or bearing rings is less significant. The transfer of radial loads is improved according to the invention.

It has proven advantageous for the radial overlap of two connecting elements to be equal to or greater than the radius of a rolling element rolling in the radially overlapping region. This makes it possible to develop the invention further by causing each raceway incorporated into a connecting element to extend at least partially into a radially overlapping region of the two connecting elements that are adjacent the particular gap, particularly along a radial extent that is the size of the radius of the particular rolling element or more. This measure makes it possible for the particular rolling elements to transmit predominantly axially acting loads, specifically axial forces and tilting moments, which is advantageous for elongated connected structures such as rotor blades of wind power plants, as well as for crane towers or the like.

Further advantages are gained if each cross-sectionally concave raceway of all the rolling-element rows extends at least partially into a radially overlapping region of the two connecting elements that are adjacent the particular gap, particularly along a radial extent that is the size of the radius of the particular rolling element or more. Such raceways are designed for spherical rolling elements. The latter are less problematic in terms of lubrication properties than, for example, rollers, where the lubricant film ruptures more easily.

It is further provided according to the invention that no cross-sectionally concavely curved raceway for rolling elements is incorporated into a connecting element in non-radially-overlapping regions of a gap between two connecting elements. The loads that are to be transmitted there usually tend to be radial loads, which are generally lower, thus eliminating the need for the production-engineering-intensive work of incorporating concave raceways, especially the usually necessary and high-expenditure process of hardening radial raceways. It is much simpler to, for example, make a radial groove in which one or more rows of sliding or rolling elements will travel, without the onerous necessity of hardening any surfaces of this radial groove.

Similar advantages can be obtained if no cross-sectionally concavely curved raceway for rolling elements is provided in a section of a gap between two rows of rolling elements rolling within the particular gap along a respective two raceways that overlap each other at least regionally in the radial direction.

It is within the scope of the invention that, for example, a rolling bearing having a plurality of cross-sectionally convex race wires is provided in a section of a gap between two rows of rolling elements that roll within the particular gap along a respective two raceways that overlap each other at least regionally in the radial direction. Due to their lack of a fitted region, such rolling bearings do generally have a lower load capacity than those with a pronounced fitted region, but this is tolerable because of the lower loads.

The invention recommends, alternatively, that a sliding bearing be provided in a section of a gap between two rows of rolling elements that roll within the particular gap along a respective two raceways that overlap each other at least regionally in the radial direction. Sliding bearings are of much simpler construction than rolling bearings and thus make assembly significantly easier. At the same time, the increased friction is only of secondary importance in many use cases involving moderate axial loads and/or low rotation speeds.

Moreover, it is within the further teaching of the invention that the rolling or sliding bearing disposed in a section of a gap between two rows of rolling elements that roll within the particular gap along a respective two raceways that overlap each other at least regionally in the radial direction has a contact angle of 30° or less, preferably a contact angle of 20° or less, particularly a contact angle of 10° or less. Such exclusively radial bearings are insensitive to axial loads and thus have no negative impact on the service life of the bearing arrangement as a whole.

A rolling bearing arrangement according to the invention is embodied in principle as an annular assembly having a center point, the so-called (circle) center point of the rolling bearing arrangement, which likewise constitutes the axis of rotation of the bearing rings rotated by the rolling bearing arrangement. The raceways in which the rolling elements are disposed are always a defined distance from this (circle) center point or axis of rotation. The rolling elements of two different raceways can have diameters that differ from each other, whereas, as a rule, the rolling elements, particularly the roller- or barrel-shaped rolling elements, in the same raceway always have the same diameter and preferably the same shape.

One or more raceways for rolling elements can be disposed in this rolling bearing arrangement, specifically in radially overlapping sections, in such fashion that the contact angle which the connecting line between the centers of the points of contact of a rolling element with its two raceways makes with the ring plane is greater than or equal to 45°. The invention is also characterized by one or more additional rolling- or [words missing] that act primarily to support radially acting force components, wherein this one or more additional rows of rolling or sliding elements do not have any incorporated raceways in the conventional sense (cf. primarily axially acting rolling elements), but instead are supported without the use of hardened raceways, thus making it possible to use, in this case, preferably at least one row of rolling elements with a contact angle of 45° or less, preferably of even 25° or less, particularly approximately exactly 0°, where appropriate also in the form of at least one wire-mounted rolling-element row.

The invention recommends that the radial bearing be implemented as at least one (additional) rolling or sliding bearing or at least one sliding-bearing or sliding-element row, which is primarily responsible for supporting radially acting force components. In the context of the invention, this additional row of rolling or sliding elements is disposed in a circumferential, groove-shaped depression fashioned either in the outer ring or in the ring corresponding thereto. As a rule, this groove-shaped depression is implemented as circularly circumferential, similarly to a plunge-cut groove. The bottom of this groove-shaped depression or plunge cut can have a curved cross section, depending on requirements. It has proven advantageous in exceptional cases if this base or bottom of the groove is implemented as convex in cross section.

In at least one such circumferential depression, for example a sliding ring and/or a sliding element can be disposed.

At least one of these circumferential depressions can receive, for example, one or more race wires, which in turn furnish raceways for a row of radial rolling elements, for example a row of balls. Here again, therefore, this is not done in the conventional way, by means of incorporated raceways, but by having a plurality, particularly four, supporting race wires disposed in the corners of a square recess having the rolling bearing (the row of balls) at its center.

It is also within the scope of the invention that incorporated into at least one of the relatively rotatable supporting or connecting elements is a running element, which is disposed adjacent at least one sliding element, positioned, for example, in the gap. In this case, on the corresponding side of the relatively rotatable supporting or connecting element, this sliding element can be radially braced or received by at least one elastic element in another depression on the opposite side.

To achieve positive support characteristics in a predominantly radial direction, said elastic element need be only slightly more elastic than the surrounding material of the mounting and connecting element or of the sliding element.

In an alternative feature of the invention, the running element and/or the element disposed on the opposite side is harder than the surrounding material of the particular mounting and connecting element. It is even conceivable for both parts (running element and elastic element) to be of nearly the same hardness, whereas the sliding element moving between these two parts has a hardness that is different not only from that of the surrounding material of the mounting and connecting element, but also from the hardness of the two parts (running element and elastic element).

Basically, according to the present invention the rolling elements primarily transferring axial loads are embodied particularly as spherical and/or cylindrical and/or roller-shaped and/or barrel-shaped elements. These are responsible particularly for supporting axially acting force components. In contrast, the radial support of primarily radially acting force components is effected, for example, via dynamic sliding friction of the relatively rotatable mounting or connecting elements. This may be effected by causing mounting or connecting elements that are in mutual contact to be brought at least intermittently into friction-locking engagement with plastic elements and/or brass elements and/or rolling-bearing steel elements (for example 100Cr6) disposed in the bearing gap.

These rolling or sliding bearing elements disposed in the bearing gap will consist primarily of rings or elements made, for example, of brass, rolling bearing steel, 100Cr6, plastic, or alternatively of any other hard-drawn material, where appropriate a material with emergency running properties or a material composite with emergency running properties. In general, the hardness of these materials may be lower than the hardness of the rolling elements transferring primarily axial loads, but the elements in the row(s) of rolling or sliding bearings that primarily transfer loads in the radial direction can reach hardnesses of up to, or alternatively slightly higher than, 50 HRC.

The teaching of the invention points out, in this regard, that the inner and the outer connecting elements can come into at least intermittent contact with each other during the operation of the rolling bearing arrangement and during the support of primarily radially acting force components. Dynamic friction moments can occur as a result. This is the case, for example, when load peaks act in the radial direction and move the relatively rotatable parts of the rolling bearing arrangement closer together, thus at least intermittently or temporarily narrowing the gap or intermittently reducing the width of said bearing gap to zero.

It has also been found to be positive in the context of the invention if the sliding inserts or sliding elements or sliding rings or ring segments placed in the rows of rolling or sliding bearings are specially treated, particularly to inhibit or increase their sliding friction coefficients.

To accomplish this, an overlay of reinforcing material or a coating applied to the element(s)—or the or their thrust faces—has proven especially advantageous. A material overlay that changes the sliding friction can alternatively be applied to at least one of the relatively rotatable mounting or connecting elements. In practice, this can be a coating.

Other processes that alter the surface properties may also be contemplated here, for example gas nitrocarburizing (a thermochemical process for enriching the surface zone of a workpiece with nitrogen and carbon. This produces a nitride layer consisting of a composite layer and a diffusion layer. In nitriding, by contrast, only nitrogen is deposited).

Pursuing the aforesaid idea of surface alteration, it is conceivable that the sliding inserts or sliding elements or sliding rings or ring segments placed in the rows of rolling or sliding bearings are, for example, hardened, annealed, nitrided, borated, burnished, carburized or gas-nitrided.

The rolling bearing arrangement according to the invention comprises, in addition to the primarily axially acting rolling-bearing rows, for example one or more sliding bearings or rows of sliding elements or one or more rows of wire rolling bearings, extending in each case annularly around the (circle) center point of the rolling bearing arrangement, particularly as a closed ring, for the purpose of transferring primarily radially acting loads or load moments. Alternatively, this radial row, as a closed ring, can consist of individual segments that are placed alongside or fitted inside one another. The positioning of this primarily radially acting sliding bearing or row of sliding elements or row of wire rolling bearings is an important factor in this case: Either this radial row can be placed in the gap axially between a plurality of rows of the primarily axially acting rows of rolling elements, or, alternatively, it can also be placed in the bearing gap above and/or below the at least one row of primarily axially acting rolling elements.

However, it is also conceivable according to the invention, for example, for this radial row to be installed in the rolling bearing arrangement as an upper rolling or sliding element ring and a lower rolling or sliding element ring, and/or alternatively as a middle rolling or sliding element ring. A plurality of such rows of rolling or sliding elements can even be placed in the gap axially between the rolling elements.

With reference to the predominantly axial load transfer performed by the inventive device, it has been found advantageous in the context of the invention for at least one of the plurality of rows of rolling elements transferring primarily axial loads to be shaped in radially overlapping sections in such a way that the contact angle which the connecting line between the centers of the points of contact of any given spherical rolling element with its raceway makes with the ring plane is greater than or equal to 45°, preferably greater than 70°, particularly greater than 85°.

Alternatively, a plurality of directly or indirectly adjacent, roller-shaped or barrel-shaped rolling elements can roll in at least one such raceway, spaced apart, if appropriate, by rolling element cage parts or rolling element spacers, it being the case that the imaginary prolongations of a plurality of axes of rotation or symmetry of these roller- or barrel-shaped rolling elements intersect at a common location, for example at the (circle) center point of the rolling bearing arrangement. Taking this inventive idea farther, it has proven expedient to shape at least one of the raceways in radially overlapping sections for receiving roller- or barrel-shaped rolling elements in such a way that the contact angle which the shortest connecting line between the centers of the points of contact of any given roller- or barrel-shaped rolling element with its raceway makes with the ring plane is greater than 80°, particularly nearly 90°.

If roller- or barrel-shaped rolling elements are placed in one or more raceways, for instance in such a way that these rolling elements are able to roll along the raceway primarily on their lateral surfaces, particularly clockwise or counterclockwise, then each of these roller- or barrel-shaped rolling elements preferably has rounded transitional regions between its lateral surface and its bases.

Taking this idea farther, it is expedient in the context of the invention if these bases of the roller- or barrel-shaped rolling elements transfer no or virtually no approximately radial load components of a rolling bearing arrangement in operation, and the lateral surfaces primarily transfer approximately axial load components.

This contemplated aspect of the invention is also especially valuable if the lateral surface of one or more of the roller- or barrel-shaped rolling elements rolling in the at least one raceway has a radius or a curvature, such that the particular roller- or barrel-shaped rolling element has, at least on one side, a convex curvature of the lateral surface with respect to its own axis of symmetry or rotation. Good interaction between such a roller- or barrel-shaped rolling element and its raceway is obtained in particular if the geometry of the particular raceway includes a strong cross-sectional radius of curvature similar to that of the lateral surface of a rolling element, such that the contour of the lateral surface of the particular roller- or barrel-shaped rolling element fits as snugly as possible against the raceway contour of the particular raceway.

In addition, the inventive device and rolling bearing arrangement always have upper and/or lower seal assemblies that seal the gap or bearing gap.

Such seal assemblies are usually arranged as annularly circumferential and react relatively flexibly, preferably in the manner of natural or synthetic rubber, to any expansion or buckling or more extensive changes in shape. The shape changes undergone by a seal of this kind, for example during operation, are largely entirely reversible.

In connection with the inventive design, particular attention should be paid to the groove-shaped depression mentioned earlier hereinabove: In at least one such groove-shaped depression, the bottom or base of the groove can be implemented as curved, specifically in such a way that the curvature is made to be convex with respect to the (circle) center point of the rolling bearing arrangement. Small radii of curvature have proven particularly advantageous in this regard.

Returning now to the inventive function of rolling or sliding support in the radial direction of load transfer, it should further be pointed out that useful results are obtained in particular with single- or multi-row segments or rings made of sliding bearing material, for example plastic, which can be coated on one or more sides or can be implemented as a plastic band with one or more steel or metal cores.

Taking these inventive ideas further, it is considered advantageous if at least one such row of rolling or sliding elements is implemented as single- or multi-row segments or rings made of plastic, alternatively of fiber-reinforced plastic, preferably as a cage band or a plurality of cage bands, which receive nonferrous-metal, graphite, steel or ceramic balls or elements embedded in the segment or ring. At least one of these radially acting rows of rolling or sliding elements can alternatively be implemented as a needle bearing cage segment band or a needle bearing ring with a plastic cage, alternatively a needle bearing cage made of fiber-reinforced plastic, which receives (nonferrous-metal/graphite/steel/or ceramic) needle rolling elements embedded in the needle bearing cage segment band or needle bearing ring. The axes of rotation of the needle rolling elements in the aforesaid needle bearing ring are aligned in the axial direction, hence parallel to the axis of rotation at the (circle) center point of the rolling bearing arrangement.

As to the dimensions and distances in the arrangement or device according to the invention, the design principles are as follows: The rolling bearing arrangement comprises, for example in the primarily axially acting load direction, the aforesaid ball-, roller- or barrel-shaped rolling elements, which can have different diameters from one another. The center points of these rolling elements of a first raceway are each the same distance from the (circle) center point of the rolling bearing arrangement, whereas the center points of another raceway, preferably located axially below the first raceway, are either the same distance or a different distance, in terms of absolute value, from the (circle) center point of the rolling bearing arrangement. Depending on which is the case, |A1|=|A2| or |A1|≠|A2|.

A highly advantageous use for the rolling bearing arrangement according to the invention is preferably as a large rolling bearing for mounting parts of a wind power plant. The use case of the blade bearing of a wind power plant has proven to be ideal. Such a blade bearing is described summarily as comprising at least two relatively rotatable annular elements arranged concentrically inside one another and at least regionally inside one another and serving to effect connection to relatively rotatable parts, wherein each two relatively rotatable connecting elements are separated from each other by a gap and at least partially overlap each other in the radial direction. Further, provided in the region of the gap in radially overlapping regions of the annular connecting elements are at least two rows of rolling elements, each of which rolls along a respective two raceways that overlap each other at least regionally in the radial direction.

It is within the further teaching of the invention that either the rolling elements disposed in the radially overlapping sections and acting primarily axially for load transfer in their raceway are embodied as at least one single-piece rolling-element ring revolving around the (circle) center point of the rolling bearing arrangement, and/or that at least one additional row of rolling or sliding elements is present, which acts primarily radially for load transfer and which can also be embodied as at least one single-piece rolling-element ring revolving around the (circle) center point of the rolling bearing arrangement.

Alternatively, for example for purposes of temperature equalization or ease of assembly, this one-piece rolling-element ring can consist in each case of at least two or more individual ring segments of the same ring. In such a device, at least one revolving rolling-element ring can be implemented as a steel ring, preferably as a gas-nitrocarburized steel ring. Instead of the steel material, brass or copper or plastic can likewise be used, optionally with fiber-reinforced material inlays or cores, or plastic with material components composed of graphite or PTFE. It is always important in the context of the invention, under these circumstances, that the hardness of the rolling element ring(s) or ring segment(s) be lower than the surface hardness of surrounding mounting or connecting elements [or] is preferably lower than, or only slightly harder than, 50 HRC.

As appropriate, the above-cited methods of altering surface properties, such as coating, or also, for example, hardening, annealing, nitriding, borating, burnishing, carburizing or gas-nitriding, are used on one or more rolling element rings or ring segments; or one or more single-piece rolling-element rings or ring segments made of plastic, alternatively fiber-reinforced plastic, are simply used.

BRIEF DESCRIPTION OF THE DRAWINGS

Further features, details, advantages and effects based on the invention will emerge from the following description of a preferred embodiment of the invention and by reference to the drawing. Therein:

FIG. 13*a* shows an annular rolling element as a circumferential ring consisting of a plurality of ring segments, which [is used] in the rolling bearing arrangement according to the invention either primarily to transfer axial loads and/or primarily to transfer radial loads.

DETAILED DESCRIPTION OF THE PREFERRED EMBODIMENT

Figure 1:
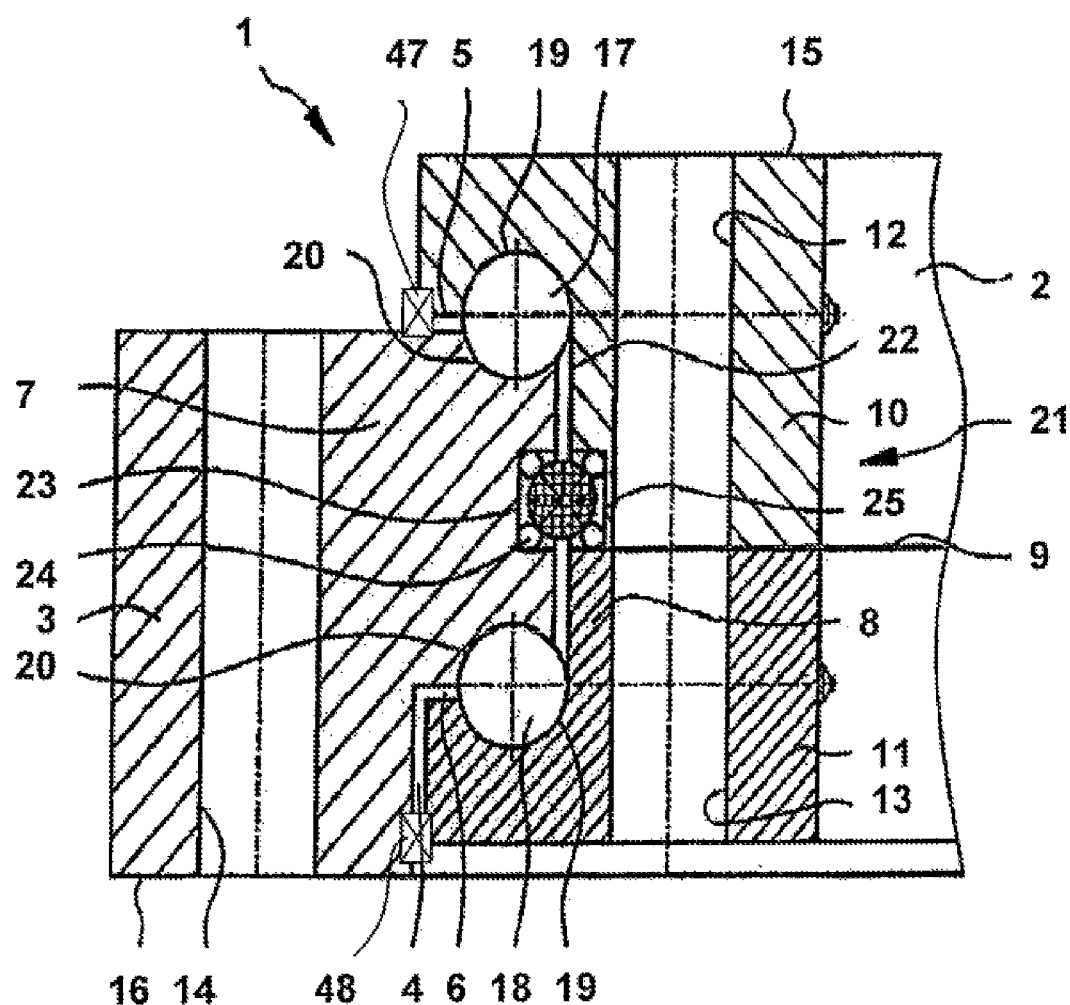
FIG. 1 is a section taken transversely through the rings of a rolling bearing according to the invention, illustrating by way of example a rolling bearing supported by four race wires disposed in the corners of a recess or groove.

The cross section through a bearing 1 depicted in FIG. 1 reveals two annular connecting elements 2, 3 arranged radially one inside the other, overlapping with each other at least partially in the axial direction. However, an arrangement of this kind is not limited to two connecting elements 2, 3; for example, radially inside connecting element 2, which is the inner one in FIG. 1, there could be yet a third connecting element, whose cross section could, for example, be mirror-inverted with respect to the outer connecting element 3 according to FIG. 1, and which could also could be configured analogously to the outer connecting element 3 in terms of gap and raceway geometry.

The two connecting elements 2, 3 of FIG. 1 are separated from each other by a gap 4. However, the path of this gap 4 does not exclusively follow a segment of a cylinder, but also has sections 5, 6 where there are more or less pronounced radial components. There, the two connecting elements 2, 3 also overlap in the radial direction. This is preferably as a result of the fact that one of the two connecting elements 2, 3—in FIG. 1, the radially outer connecting element (3), although this is not mandatory—has a fully circumferential collar 7 or flange, which protrudes radially toward the respectively other connecting element 3, 2. So that the two connecting elements 2,3 do not brush against each other at that location, the respectively other connecting element 3, 2—opposite the collar 7 or flange—is provided with a fully circumferential groove 8. Since the radial extent of the collar 7 and also the depth of the groove 8 are considerably greater than the width of the gap 4, the collar 7 or flange engages in the groove 8. This insertion depth corresponds to the overlap between the two connecting elements 2, 3. To make it possible to assemble the bearing 1 despite this overlap, the connecting element 3, 2 containing the groove 8 is divided along an approximately flat main surface 9 into an upper ring 10 and a lower ring 11.

The two rings 10, 11 of the divided connecting element 3, 2 are each provided with coronally distributed, mutually aligned through-bores 12, 13 through which fastening screws can be passed. The respective connecting element 2, 3 that is not divided is also provided with fastening bores 14, preferably also with through-bores for fastening screws.

To simplify connection to the system or machine parts that are to be rotated relative to one another, each connecting element 2, 3 has, projecting in the axial direction toward the respectively other connecting element 3, 2, a respective connecting surface 15, 16 which is to be brought into contact with the system or machine part to be secured.

A respective row of rolling elements 17, 18 is provided in the region of the overlap, i.e., between a respective two mutually facing flanks of the collar 7, on the one side, and of the groove 8, on the other side. These are preferably spherical rolling elements that roll along raceways 19, 20 having a concave cross section. These raceways 19, 20 are preferably incorporated directly into the respective base body of the particular connecting element, particularly by machining the particular connecting-element base body.

Since the raceways 19, 20 have nearly the same radius of curvature in cross section as the rolling elements 17, 18 that roll along them, they fit snugly against the surfaces of the rolling elements 17, 18. These cross-sectionally fitted regions surround the great circle of the surface of each ball to 90° or more. Since the raceways 19, 20 of a row of rolling elements overlap in the radial direction, these spherical rolling elements 17, 18 each have a contact angle >0°, preferably a contact angle of 45° or more.

A contact angle of approximately 45° results, for example, in the creation of two four-point bearings that are able to handle both axial and radial loads. In this case there is no need for any additional bearings with a contact angle <45°, so here a total of two rows of rolling elements per gap would be sufficient to accommodate all load cases.

If the contact angle is >45°, the radial load capacity of the rolling element rows 17, 18 declines and finally tapers off completely at a contact angle of 90°. In this case, an additional radial bearing 21 or bearing with a radial load capacity must be provided, particularly in the region 22 of the gap 4 bounded by the free end side of the collar 7, on the one side, and the bottom of the groove 8, on the other side, i.e., which thus is approximately cylinder-segment-shaped.

In the embodiment according to FIG. 1, the bearing is a rolling bearing 23 with four race wires 24 in the corners of respective groove-shaped depressions 25 located in the free end side of the collar 7, on the one hand, and inside the base of the groove 8, on the other hand. With this arrangement, this bearing 23 has the quality of a four-point bearing, which is able to transfer not only axial forces, but also radial forces as well.

At least one such circumferential depression 25 can also have, for example, one or more race wires inside it, which in turn support a radial rolling element row, for example a row of balls. This is illustrated by way of example in FIG. 1. This primarily radially acting ball row 23 also is not supported in the conventional manner by means of incorporated raceways, but instead by means of a plurality of, particularly four, supporting race wires 24 that come to lie in the corners of a square recess in the center of which the rolling bearing 23, for example the ball row, is located.

Figure 2:
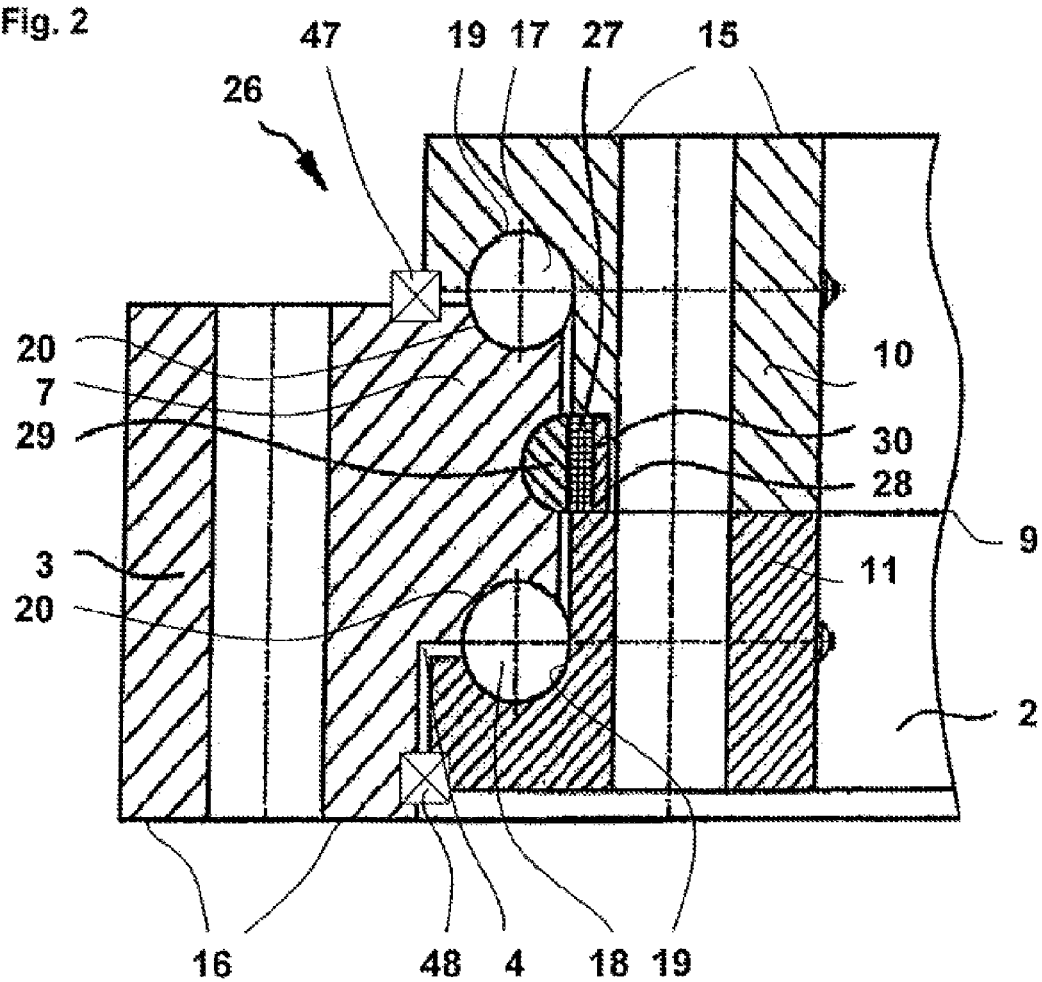
FIG. 2 shows another embodiment of the invention in a representation corresponding to FIG. 1, but illustrating by way of example a sliding element mounted between a running element and an elastic element.

The bearing embodiment 26 illustrated in FIG. 2 differs from bearing 1 only in the nature of the radial bearing 22. Here, a sliding bearing is provided with a sliding element 27, which is received in a groove-shaped depression 28 in an approximately central, cylinder-segment-shaped gap section 22. The latter is able to slide along a running element 29 disposed separately in the respectively other connecting element 2, 3 and can, if appropriate, be cushioned in its rearward region by an elastic element 30.

Figure 3:
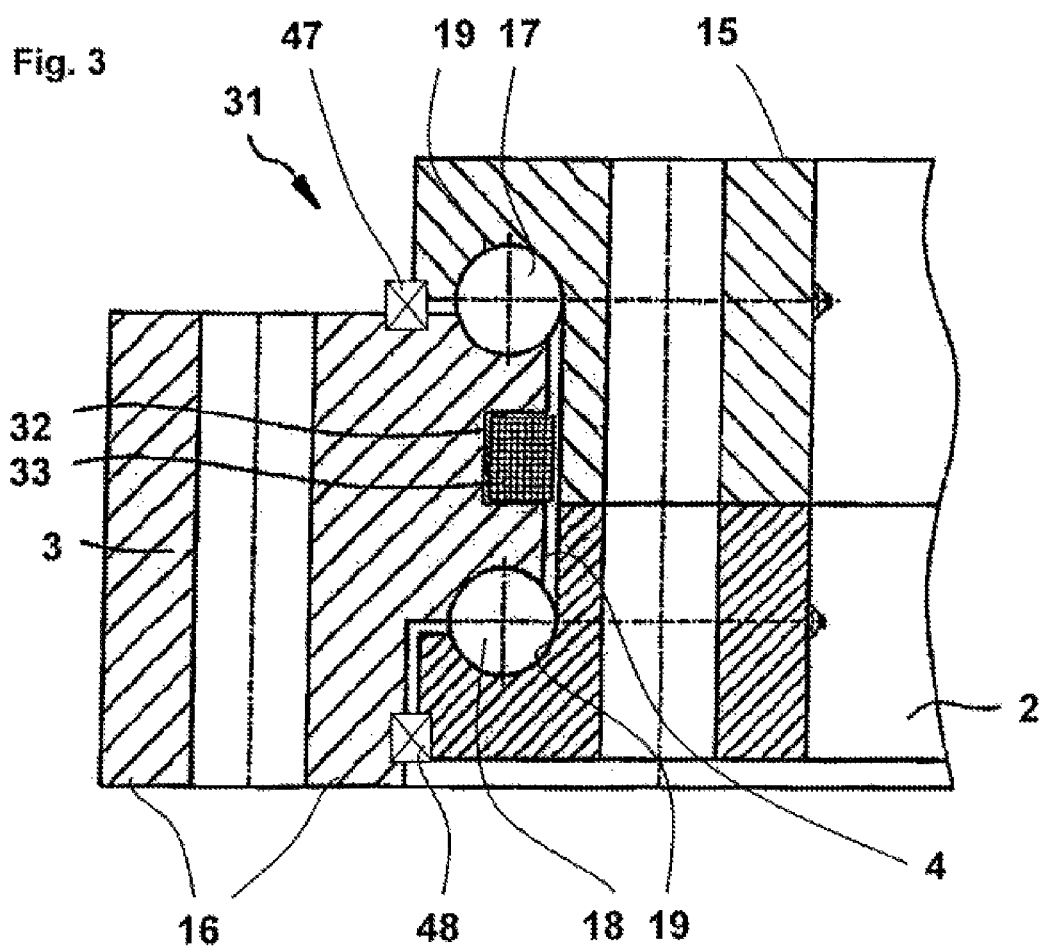
FIG. 3 shows a modified embodiment of the invention in a representation corresponding to FIG. 1, but illustrating by way of example a rolling bearing or a ring that is disposed in a depression.

With the bearing design 31 according to FIG. 3, the sliding element 33 received there in a groove-shaped depression 32 in the cylinder-segment-shaped middle gap section 22 moves directly along the respectively other connecting element 2, 3.

Figure 4:
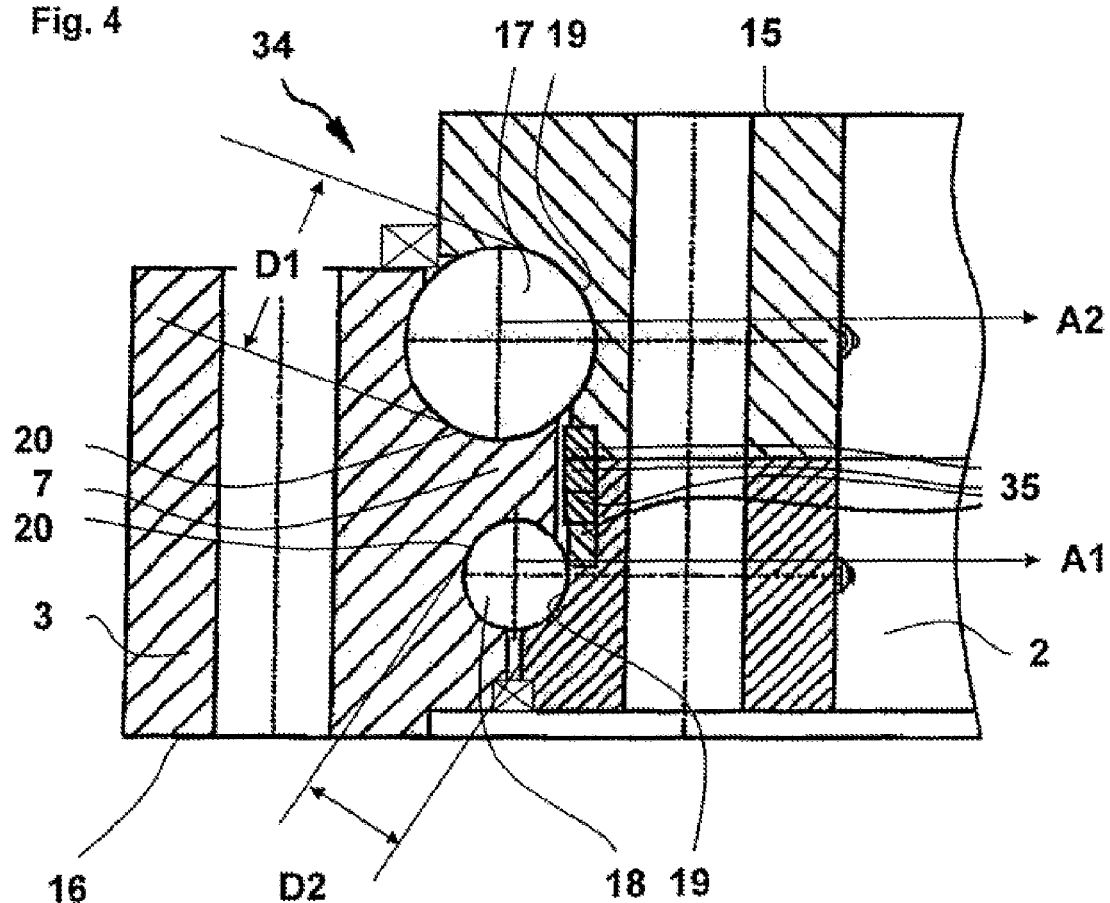
FIG. 4 is a further modified embodiment of the invention in a representation corresponding to FIG. 1, but illustrating by way of example various large rolling bearings between which one or more sliding rings are disposed.

The bearing design 34 depicted in FIG. 4 is similar. Here, too, there is only one sliding ring 35, seated in a groove, but in contrast to FIG. 3, in this case the groove is not in the undivided connecting element 3, but rather in a ring of the divided connecting element 2.

Such sliding rings can consist, for example, of metal, for example brass, or of a plastic, and and/or of a material having "emergency running properties." Furthermore, such sliding rings can be divided into a plurality of segments, optionally with gaps between them. It is further possible for the sliding rings or sliding segments to be provided with a coating.

FIG. 4 shows, furthermore, that the rolling elements 17, 18 of the two rolling-element rows with a predominantly axial load capacity can also be of different sizes.

Figure 5:
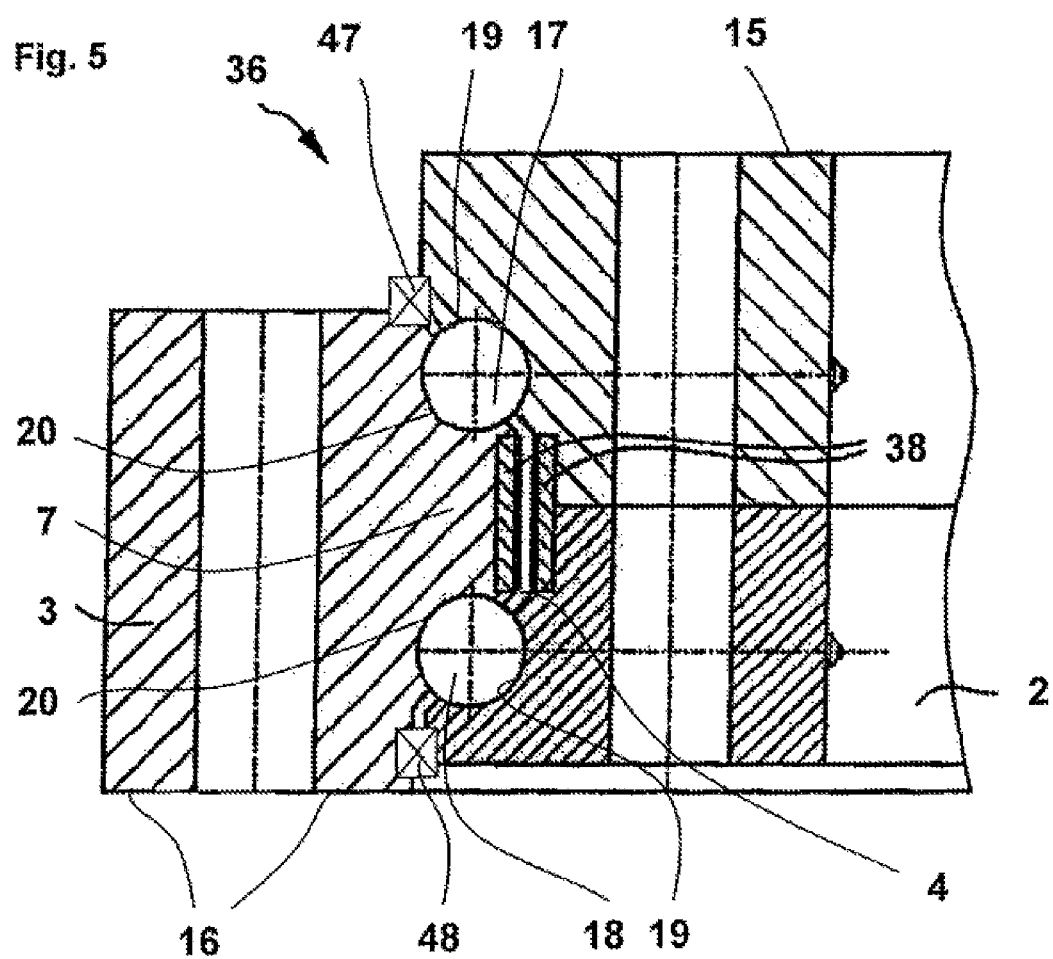
FIG. 5 shows another different embodiment of the invention in a representation corresponding to FIG. 1, but illustrating by way of example several sliding rings that absorb radial load components, the rolling bearing arrangement being provided, at least in portions thereof, with a slantingly extending sealing gap.
Figure 6:
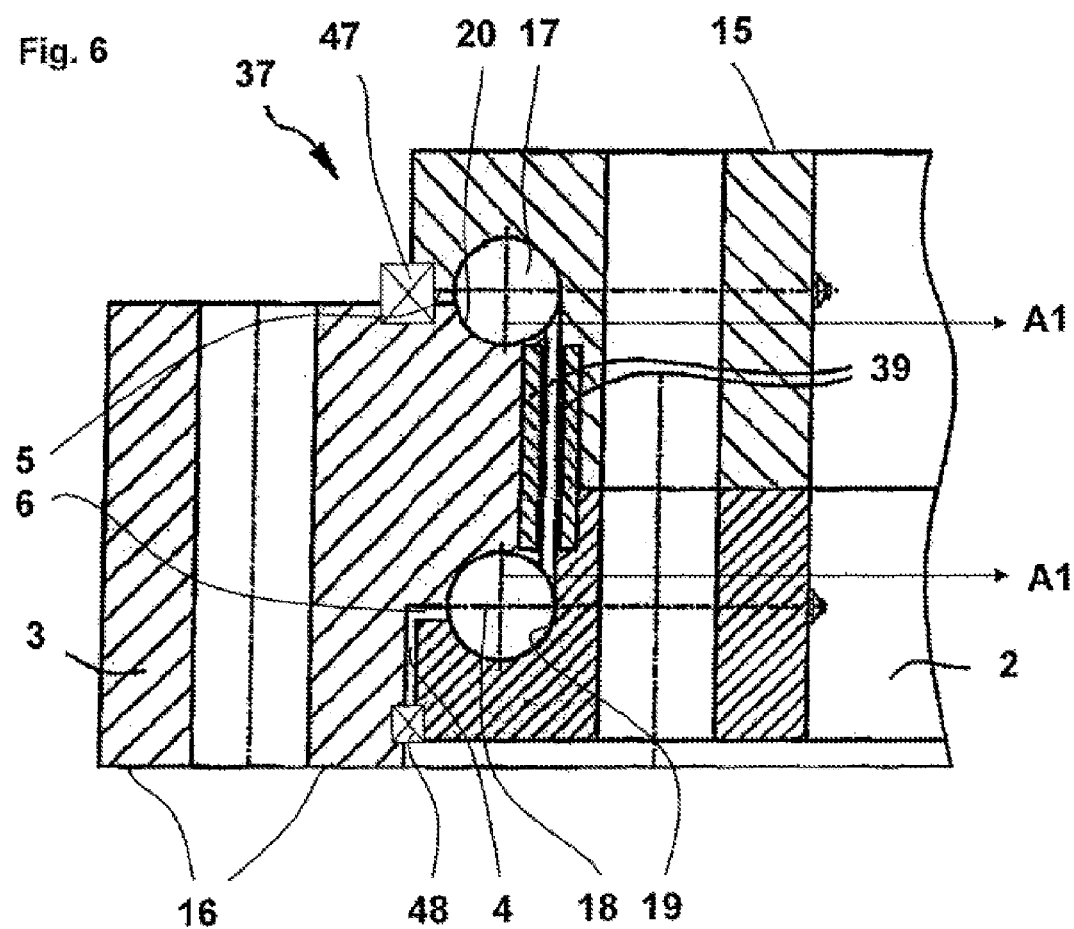
FIG. 6 shows another embodiment of the invention in a representation corresponding to FIG. 5, but illustrating by way of example several sliding rings that absorb radial load components, wherein the rolling bearing arrangement is provided, at least in portions thereof, with a horizontally extending sealing gap.

FIGS. 5 and 6 illustrate two other embodiments of a rolling bearing 36, 37 according to the invention. Here, inserted in the cylinder-segment-shaped middle gap section 22 on two connecting elements 2, 3 is a respective sliding ring 38, 39 or a respective row of sliding segments that slide along one another. The pairs of materials used can be selected according to the individual case, for example two similar materials or, alternatively, a harder material that slides along a softer material.

The embodiments 36, 37 according to FIGS. 5 and 6 also differ from each other in that in embodiment 37 according to FIG. 6, the gap 4 follows an exclusively radial path in the region of the radial overlap, i.e. it lies in one plane, whereas in embodiment 36 of FIG. 5, the gap 4 follows an oblique cross-sectional path in the region of the radial overlap, i.e. is conical-segment-shaped, for example with a cone apex angle of approximately 90°, corresponding to an inclination of the gap cross section by approximately 45° relative to the main plane of the bearing.

As is depicted in all the embodiments except FIG. 4, the raceways on which the rolling elements roll are always a defined distance A1, A2 from this (circle) center point K or axis of rotation. The rolling elements 17, 18 of two different raceways can also, however, have mutually different diameters D1, D2, as illustrated in FIG. 4, whereas rolling elements that are in the same raceway, particularly also the roller- or barrel-shaped rolling elements, are usually always of the same diameter and preferably the same shape.

Figure 11:
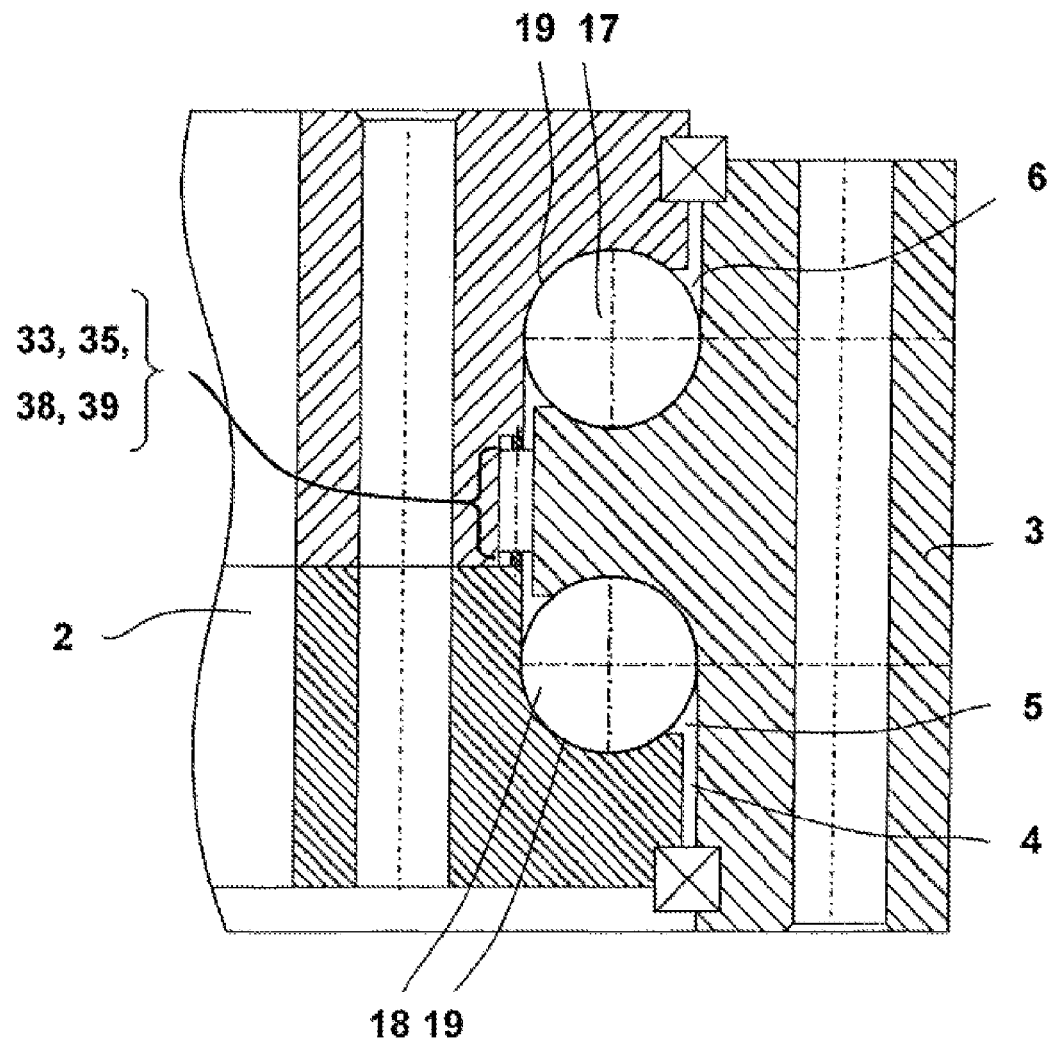
FIG. 11 shows a modified embodiment of the invention in a representation corresponding to FIG. 7, illustrating by way of example a sliding ring or a sliding element that absorbs radial load components, wherein the sliding ring or sliding element is provided as having vertically oriented needle bearing components.
Figure 12:
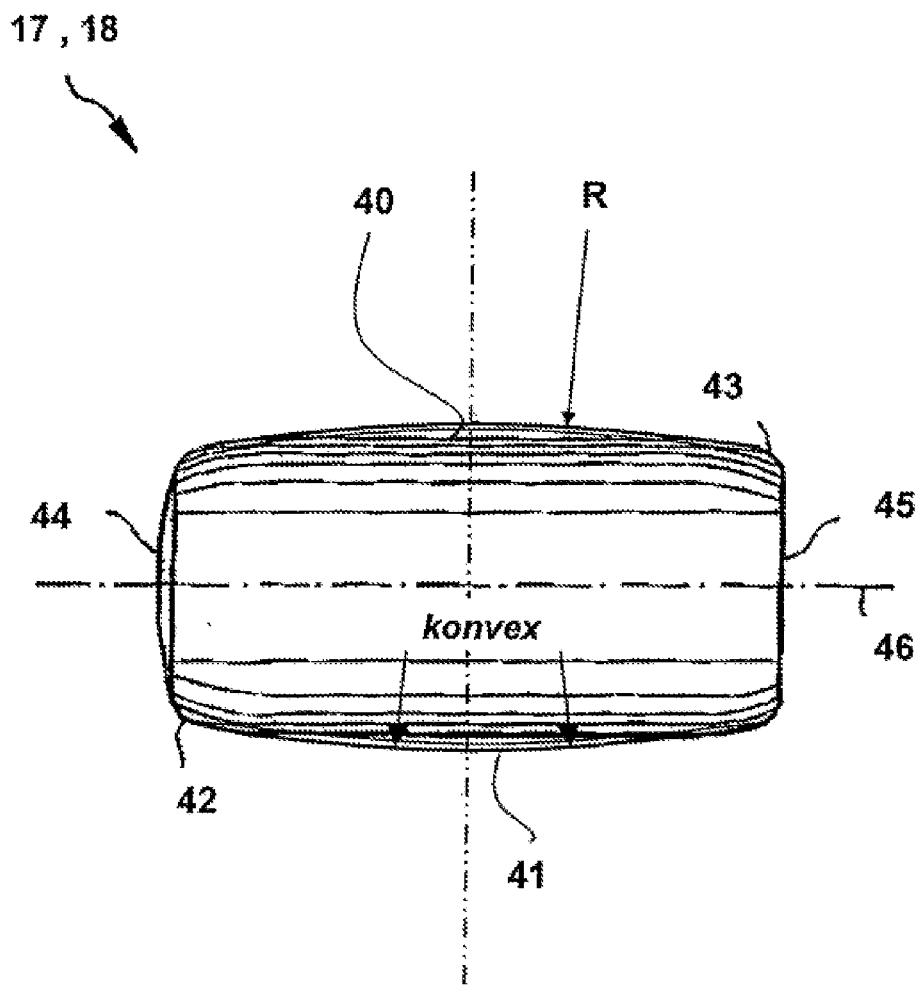
FIG. 12 shows a cylindrical or barrel-shaped rolling bearing, which in the rolling bearing arrangement according to the invention is used in one or more races to transfer primarily axial loads.

The invention recommends implementing, in addition to rolling-element rows 17, 18, at least one other rolling or sliding-element row 23, 27, 33, 35, 38, 39 that is primarily responsible for supporting radially acting force components, as can be seen in FIG. 1 in combination with FIG. 11.

According to the invention, this additional row of rolling or sliding elements is disposed in at least one circumferential depression 25, 32, which is introduced into either the outer ring or the ring corresponding thereto. This groove-shaped depression is usually circularly circumferential, in the manner of a plunge-cut groove. Depending on requirements, the bottom of this groove-shaped depression or plunge cut can be implemented as curved, as illustrated by way of example in FIGS. 8 and 9. In exceptional cases, it has proven advantageous for this bottom to be implemented as convex in cross section. For example, one or more sliding rings and/or sliding elements 27, 33, 35, 38, 39 are guided in at least one such circumferential depression.

Figure 7:
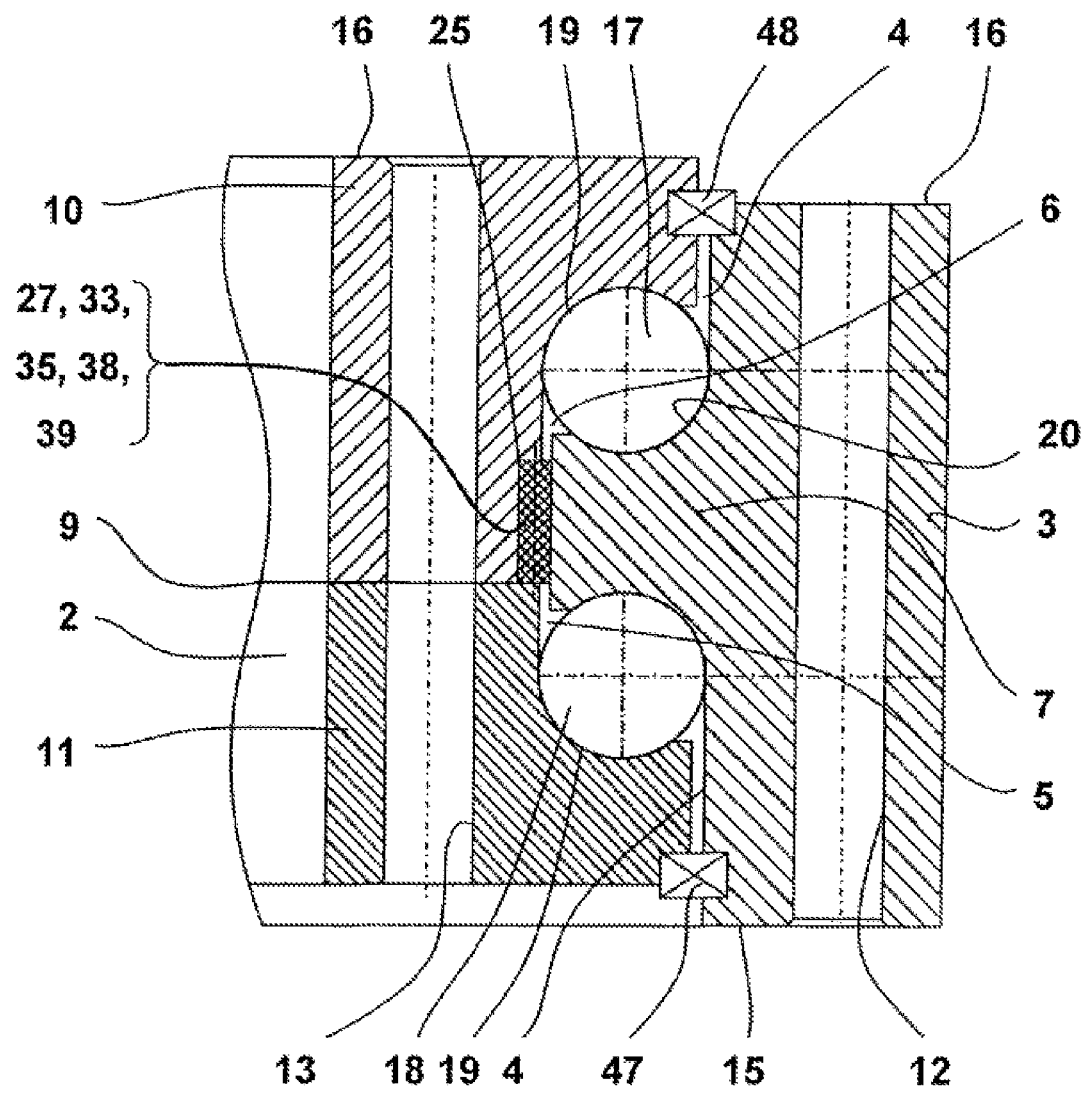
FIG. 7 shows by way of example another embodiment of the rolling bearing invention [sic] as a section taken transversely through the rings, illustrating a sliding ring or a sliding element that absorbs radial load components, wherein the sliding ring or sliding element is arranged vertically in the rolling bearing arrangement.

FIG. 7 shows, by way of example, another embodiment of the rolling bearing arrangement as a section taken transversely through the rings, illustrating just such a sliding ring or a sliding element 27, 33, 35, 38, 39 that absorbs radial load components, said sliding ring or sliding element being disposed vertically in the rolling bearing arrangement.

Figure 8:
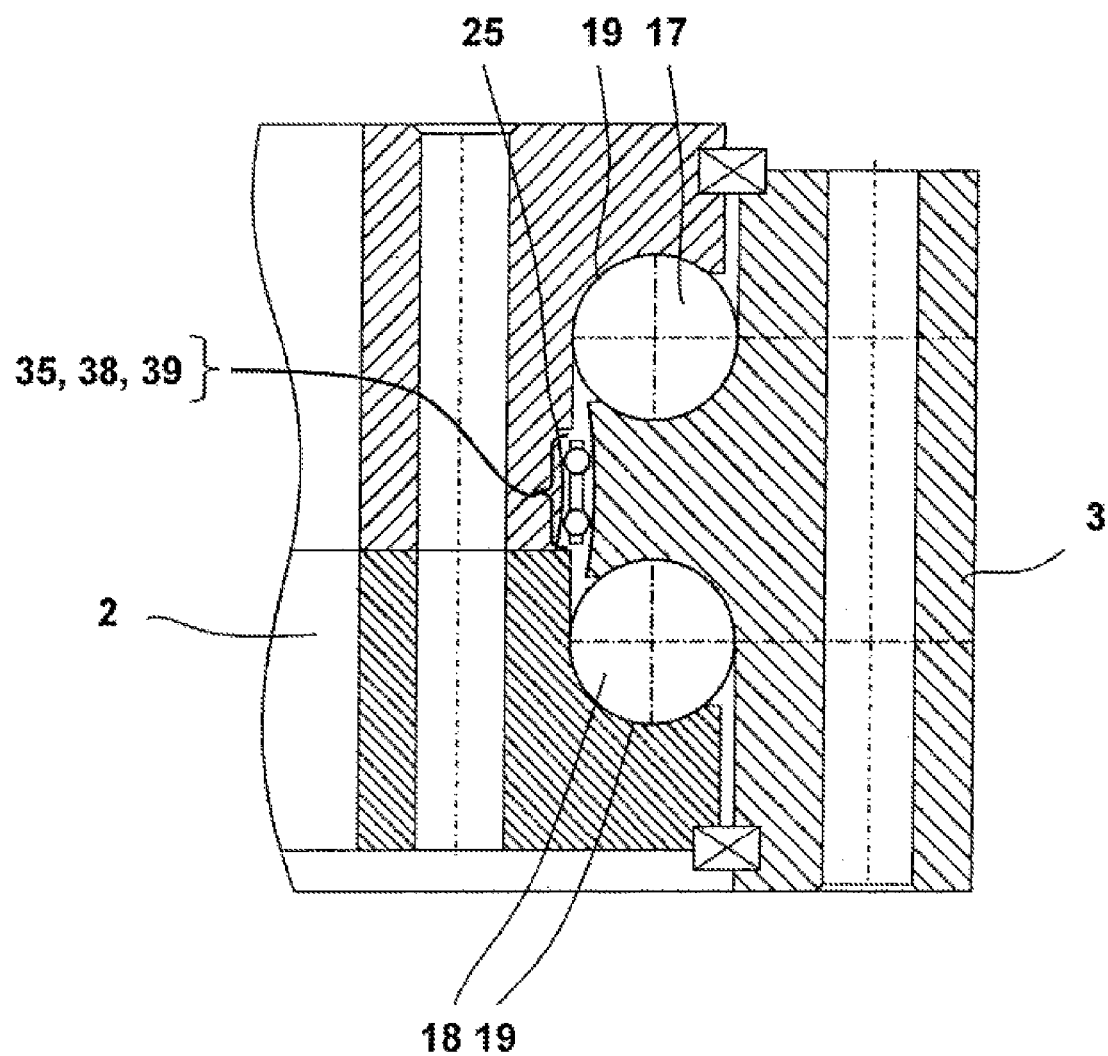
FIG. 8 shows a modified embodiment of the invention in a representation corresponding to FIG. 7, but illustrating by way of example a sliding ring disposed in a (convex) groove-shaped depression, wherein the sliding ring contains friction-reducing or pressure-exerting rolling elements.
Figure 10:
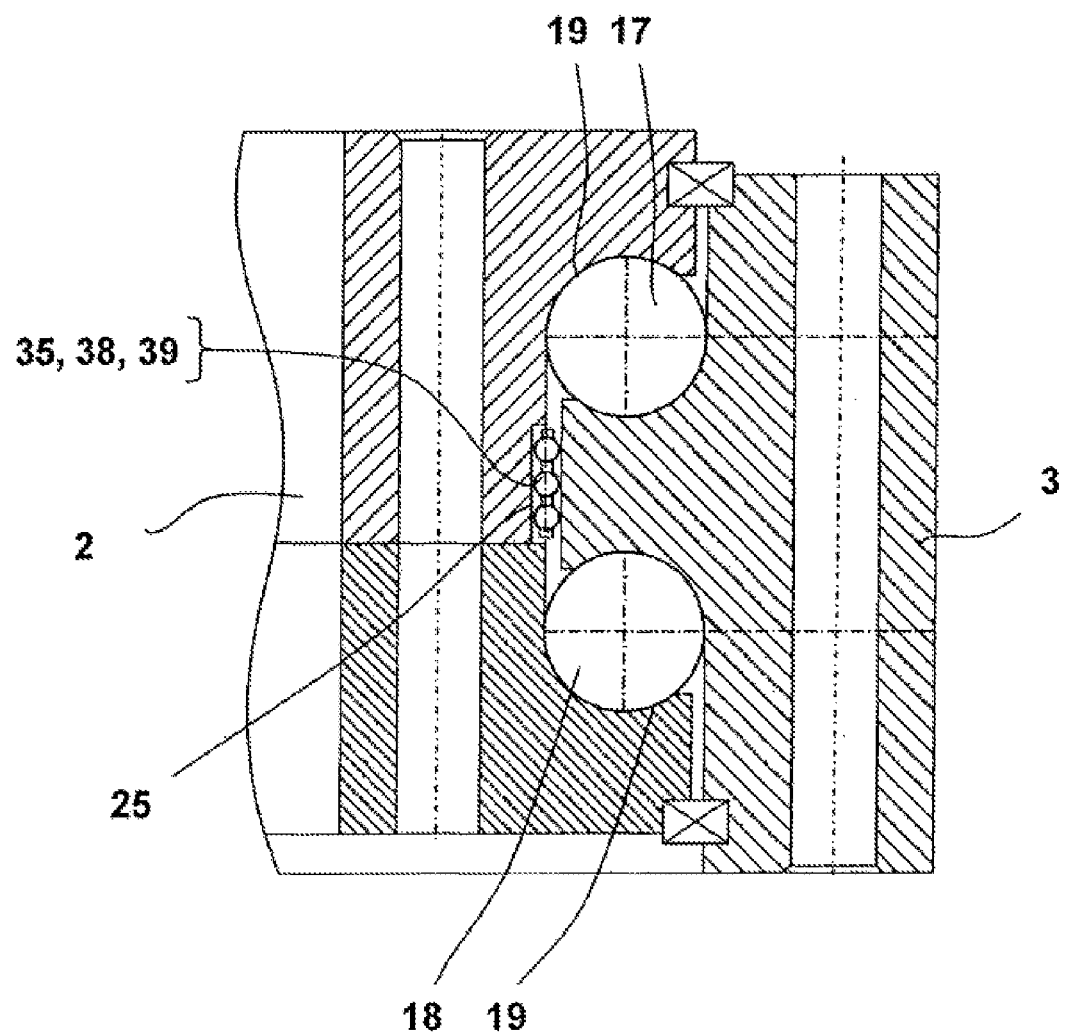
FIG. 10 shows a modified embodiment of the invention in a representation corresponding to FIG. 8, but illustrating by way of example a sliding ring disposed in a groove-shaped depression having a horizontally flat groove bottom, wherein the sliding ring contains friction-reducing or pressure-exerting rolling elements.

FIG. 8 shows a modified embodiment of the invention in a representation corresponding to FIG. 7, but illustrating by way of example a sliding ring 35, 38, 39 that is disposed in a groove-shaped depression 25 (which is convex from the direction of the (circle) center point K), wherein this sliding ring for example contains friction-reducing or pressure-exerting rolling elements, for example balls. FIG. 10 shows a similar representation. Each of the figures depicts a ring 35, 38, 39 made of plastic, alternatively made of fiber-reinforced plastic, which receives respective nonferrous-metal, graphite, steel or ceramic elements embedded in the segment or ring. This sliding ring 35, 38, 39 illustrated in FIG. 8 can be made of plastic. This plastic can be singly or multiply coated. The elements received by the ring 35, 38, 39 can be small rolling or sliding elements, for example small balls, although needle-shaped rolling elements are also possible, as illustrated in FIG. 11. Other small friction-reducing or pressure-exerting rolling elements, which are also surrounded virtually completely by the material of the sliding ring(s) and/or sliding element(s) 27, 33, 35, 38, 39, can also be used. These can be, for example, cylindrical or barrel-shaped or cone-shaped friction-reducing or pressure-exerting rolling elements. Sliding elements of small dimensions can also be used, if they are surrounded by the material of the particular sliding ring and/or sliding element 27, 33, 35, 38, 39.

Figure 9:
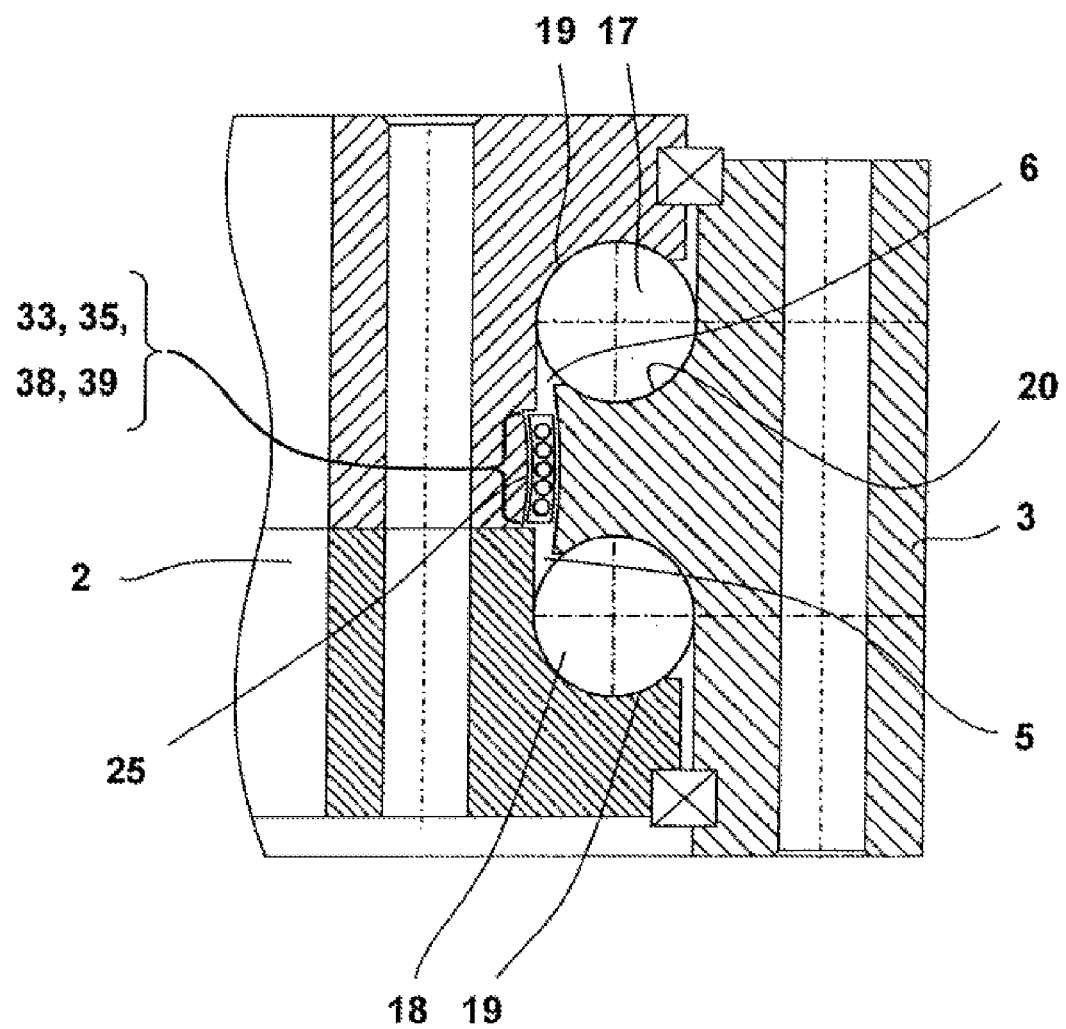
FIG. 9 shows a further modified embodiment of the invention in a representation corresponding to FIG. 7, but illustrating by way of example a sliding element or a sliding ring disposed in a (convex) groove-shaped depression, wherein the sliding ring or sliding element contains inlays, cores or fiber reinforcements.

FIG. 9, for instance, shows the further modified embodiment of the invention from either FIG. 7 or FIG. 8, illustrating a sliding element or a sliding ring disposed in a (convex) groove-shaped depression, wherein the sliding ring or sliding element 33, 35, 38, 29 contains inlays, cores or fiber reinforcements. Consequently, this sliding element or sliding ring 33, 35, 38, 29 is composed of steel or metal cores or steel or metal strands, for example encased in plastic. This plastic ring can also be singly or multiply coated. A composite material other than plastic can also be used.

Figure 13:
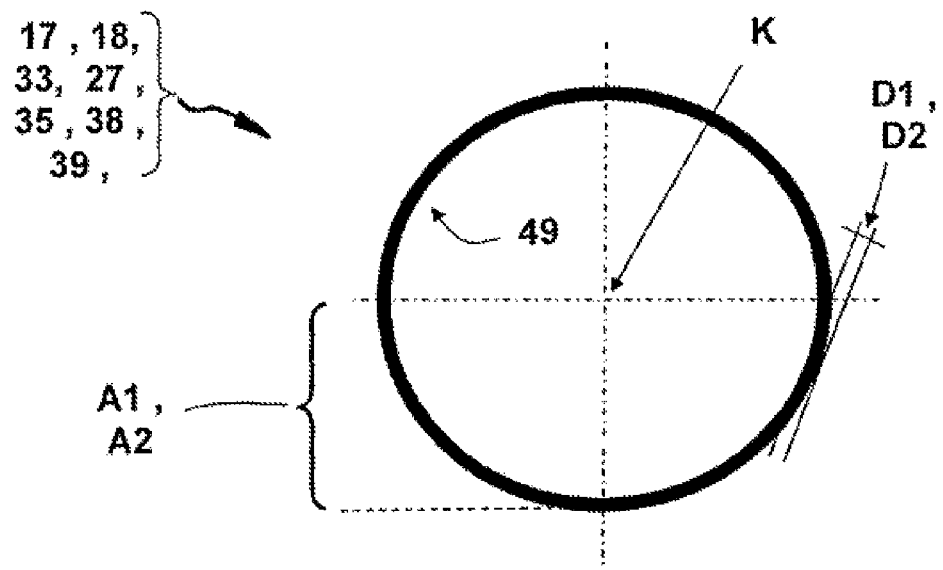
FIG. 13 shows an annular rolling element as a circumferential ring, which in the rolling bearing arrangement according to the invention is used either primarily to transfer axial loads and/or primarily to transfer radial loads.
Figure 13:
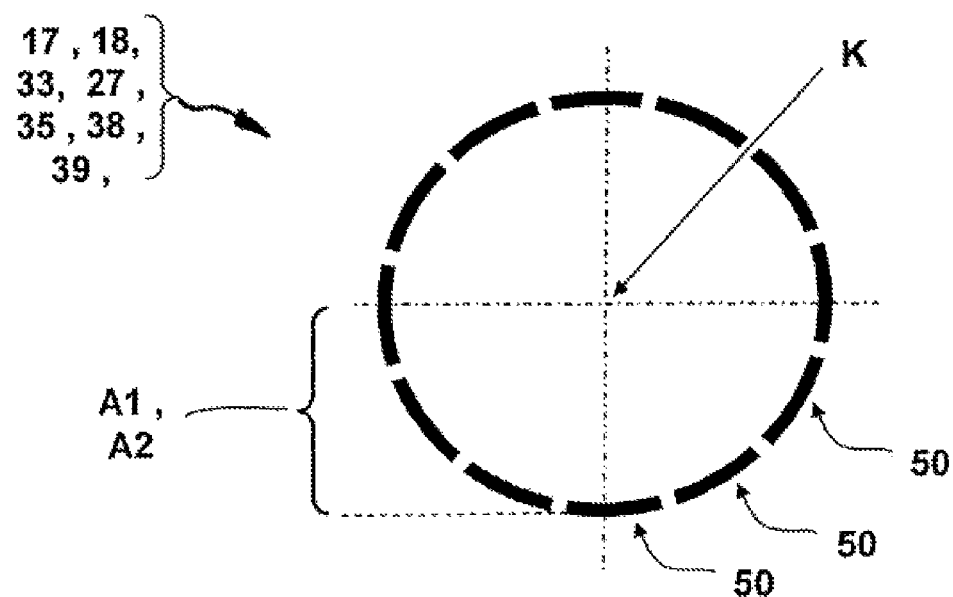

FIGS. 13 and 13a show an annular rolling element as a circumferential ring 49, consisting in the case of FIG. 13a of a plurality of ring segments 50, which is used in the inventive rolling bearing arrangement either primarily for transferring axial loads and/or primarily for transferring radial loads. The rolling element ring 49 is implemented, for example, as a steel ring. Alternatively, as can be seen in FIG. 13a, the individual ring segments 50 thereof are implemented as a steel ring. This ring 49 or its segments 50 will preferably be used in the rolling bearing arrangement in the form of a gas-nitrocarburized steel ring. Alternatively, this ring 49 or its segments 50 can be implemented as a brass or copper ring, or as a plastic ring, where appropriate with fiber-reinforced material inlays or cores, or with material components composed of graphite or PTFE, wherein the hardness of rolling-element ring(s) 49 or ring segment(s) 50 [sic].

| List of Reference Numerals | |
| --- | --- |
| 1 | Rolling bearing |
| 2 | Connecting element |
| 3 | Connecting element |
| 4 | Gap; bearing gap |
| 5 | Section |
| 6 | Section |
| 7 | Collar |
| 8 | Groove |
| 9 | Main surface |
| 10 | Upper bearing element; ring |
| 11 | Lower bearing element; ring |
| 12 | Through-bore |
| 13 | Through-bore |
| 14 | Fastening bore |

-continued

| List of Reference Numerals | |
| --- | --- |
| 15 | Connecting surface |
| 16 | Connecting surface |
| 17 | Rolling element |
| 18 | Rolling element |
| 19 | Raceway |
| 20 | Raceway |
| 21 | Radial bearing |
| 22 | Region |
| 23 | Rolling bearing |
| 24 | Race wire |
| 25 | Groove-shaped depression |
| 26 | Rolling bearing |
| 27 | Sliding element |
| 28 | Depression |
| 29 | Running element |
| 30 | Elastic element |
| 31 | Rolling bearing |
| 32 | Depression |
| 33 | Sliding element |
| 34 | Rolling bearing |
| 35 | Sliding ring |
| 36 | Rolling bearing |
| 37 | Rolling bearing |
| 38 | Sliding ring |
| 39 | Sliding ring |
| 40 | Rolling element |
| 41 | Lateral surface |
| 42/43 | Transition |
| 44/45 | End side |
| 46 | Axis of rotation |
| R | Radius; curvature |
| A1/A2 | Distance |
| D1/D2 | Diameter |
| K | (Circle) center point |
| 47 | Upper sealing arrangement |
| 48 | Lower sealing arrangement |
| 49 | Ring |
| 50 | Ring segment |

The invention claimed is:

1. A rolling bearing arrangement (1, 26, 31, 34, 36, 37), for mounting parts of an energy system, comprising at least two relatively rotatable annular connecting elements (2, 3) arranged concentrically with one another and at least regionally inside one another, for connection to relatively rotatable parts of the energy system, wherein the two relatively rotatable connecting elements (2, 3) are separated from each other by a gap (4) and at least partially overlap each other in the radial direction, wherein, further, provided in the region of the gap (4) in radially overlapping regions of the annular connecting elements (2, 3) are at least two rows of rolling elements (17, 18) each rolling element rolls along a respective two raceways (19, 20) that overlap each other at least regionally in the radial direction, wherein one or more raceways (19, 20) for rolling elements (17, 18) are disposed in radially overlapping sections (5, 6) in such fashion that the contact angle which the connecting line between the centers of the points of contact of the rolling element (17, 18) with the respective two raceways makes with the ring plane is equal to or greater than 45°, such that the rolling bearing serves to transmit predominantly axially acting force components, and wherein at least one additional bearing is provided for transmitting predominantly radially acting force components and whose resulting contact angle is less than 45°, characterized in that the rolling elements (17, 18) in the at least two rows of rolling elements (17, 18) transmitting predominantly axially acting forces have a spherical shape, and wherein the additional bearing for transmitting predominantly radially acting force components (i) either has no raceways for radial rolling bearings incorporated directly into the annular connecting elements (2, 3) or (ii) has only such raceways for a radial rolling bearing incorporated directly into the annular connecting elements (2, 3) having a maximum distance between them, perpendicular to the raceway surface, that is equal to or less than 25% of the largest distance between the two raceways of one of the at least two rows of rolling elements (17, 18) transmitting predominantly axially acting forces, perpendicular to the raceway surface.

2. The rolling bearing arrangement (1, 26, 31, 34, 36, 37) as in claim 1, characterized in that the radial overlap of two connecting elements (2, 3) is equal to or greater than the radius of one of the rolling elements (17, 18) rolling in the radially overlapping region.

3. The rolling bearing arrangement (1, 26, 31, 34, 36, 37) as in claim 1, characterized in that each raceway (19, 20) incorporated into a connecting element (2, 3) extends into a radially overlapping region of the two connecting elements (2, 3) that are adjacent the gap (4), at least partially or along a radial extent that is the size of the radius of one of the rolling elements (17, 18) that roll along the said raceway (19, 20), or more.

4. The rolling bearing arrangement (1, 26, 31, 34, 36, 37) as in claim 1, characterized in that each cross-sectionally concave raceway (19, 20) of the two rolling-element rows (17, 18) extends into a radially overlapping region (5, 6) of the two connecting elements (2, 3) that are adjacent the gap (4), at least partially or along a radial extent that is the size of the radius of one of the rolling elements (17, 18) that roll along the said raceway (19, 20), or more.

5. The rolling bearing arrangement (1, 26, 31, 34, 36, 37) as in claim 1, characterized in that no cross-sectionally concavely curved raceway for the rolling elements is incorporated into a connecting element (2, 3) in non-radially-overlapping regions (22) of the gap (4) between two connecting elements (2, 3).

6. The rolling bearing arrangement (1, 26, 31, 34, 36, 37) as in claim 1, characterized in that no cross-sectionally concavely curved raceway for rolling elements is provided in a section (22) of the gap (4) between the two rows of rolling elements (17, 18) rolling within the gap (4) along the respective two raceways (19, 20) that overlap each other at least regionally in the radial direction.

7. The rolling bearing arrangement (1, 26, 36, 37, 31, 34) as in claim 1, characterized in that the row of sliding bearings or sliding elements (33, 35, 38, 39) or the row of wire rolling bearings (27) extends annularly around a (circle) center point (K) of the rolling bearing arrangement (1, 26, 36, 37, 31, 34), as a closed ring, or as a closed ring comprised of ring segments placed alongside one another or fitted in alignment inside one another.

8. The rolling bearing arrangement (1, 26, 36, 37, 31, 34) as in claim 1, characterized in that in a groove-shaped depression (25) with a curved groove base, the curvature is implemented as convex relative to a (circle) center point (K) of the rolling bearing arrangement (1, 26, 36, 37, 31, 34).

9. The rolling bearing arrangement (1, 26, 36, 37, 31, 34) as in claim 1, characterized in that the additional bearing for transmitting predominantly radially acting force components comprises a radial rolling or sliding element row (23, 27, 33, 35, 38, 39) which is disposed in a circumferential groove-shaped depression (25) in one of the two relatively rotatable connecting elements (2, 3).

10. The rolling bearing arrangement (1, 26, 36, 37, 31, 34) as in claim 1, characterized in that the additional bearing for transmitting predominantly radially acting force components comprises a sliding ring (35, 38, 39) and/or a sliding element (27) which is guided in at least one circumferential depression (25).

11. The rolling bearing arrangement (1, 26, 31, 34, 36, 37) as in claim 1, characterized in that the additional bearing for transmitting predominantly radially acting force components comprises a rolling bearing (23) having a plurality of race wires (24) with convex cross sections, which is provided in a section (22) of the gap (4) between two rows of rolling elements (17, 18) that roll within the gap (4) along the respective two raceways (19, 20) that overlap each other at least regionally in the radial direction.

12. The rolling bearing arrangement (1, 26, 36, 37, 31, 34) as in claim 11, characterized in that at least one of the race wires (24) is received in at least one circumferential depression (25).

13. The rolling bearing arrangement (1, 26, 36, 37, 31, 34) as in claim 11, characterized in that the plurality of race wires (24) are each disposed in the region of a respective channel on the bottom of a respective groove-shaped recess in the connecting elements of the rolling bearing arrangement (1, 26, 36, 37, 31, 34), in the center of which a plurality of additional spherical rolling elements (23) roll along the race wires.

14. The rolling bearing arrangement (1, 26, 31, 34, 36, 37) as in claim 1, characterized in that the additional bearing for transmitting predominantly radially acting force components is implemented as a sliding bearing (27, 33, 38, 29) which is provided in a section (22) of the gap (4) between the two rows of rolling elements (17, 18) that roll within the gap (4) along the respective two raceways (19, 20) that overlap each other at least regionally in the radial direction.

15. The rolling bearing arrangement (1, 26, 36, 37, 31, 34) as in claim 1, characterized in that the additional bearing for transmitting predominantly radially acting force components comprises a single- or multi-row arrangement of segments or rings made of a sliding bearing material or of plastic, which sliding bearing material or plastic is coated on one or more sides or which encases steel or metal cores, wherein the single- or multi-row arrangement of segments or rings made of a sliding bearing or of a plastic, is able to rotate clockwise or counterclockwise relative to the directly adjacent connecting elements (2, 3).

16. The rolling bearing arrangement (1, 26, 36, 37, 31, 34) as in claim 1, characterized in that the additional bearing for transmitting predominantly radially acting force components comprises a running element (29) incorporated into at least one of the relatively rotatable supporting or connecting elements (2, 3, 10, 11), which is disposed adjacent at least one sliding element (27) positioned in the gap (4), wherein on the corresponding side of the relatively rotatable supporting or connecting element (2, 3, 10, 11), said sliding element (27) is radially supported or received by at least one elastic element (30) disposed in another depression (28).

17. The rolling bearing arrangement (1, 26, 36, 37, 31, 34) as in claim 16, characterized in that the running element (29) and/or the elastic element (30) disposed on the opposite side (i) are harder than the surrounding material of the connecting element (2, 3, 10, 11), and/or (ii) are of nearly identical hardness, while the sliding element (27) also has a different hardness from the surrounding material of the connecting element (2, 3, 10, 11).

18. The rolling bearing arrangement (1, 26, 36, 37, 31, 34) as in claim 1, characterized in that the supporting of primarily radially acting force components causes sliding friction of the connecting elements (2, 3, 10, 11) in the radial direction.

19. The rolling bearing arrangement (1, 26, 36, 37, 31, 34) as in claim 1, characterized in that the connecting elements (2, 3, 10, 11) that are in mutual contact are placed at least intermittently in friction with brass elements and rolling bearing steel and/or plastic elements and rolling bearing steel disposed in the rolling bearing arrangement (1, 26, 36, 37, 31, 34).

20. The rolling bearing arrangement (1, 26, 36, 37, 31, 34) as in claim 1, characterized in that the additional bearing for transmitting predominantly radially acting force components comprises inlays or sliding elements (27, 33) or rings (38, 39) or sliding ring segments (35) made of brass or steel or plastic or of a material having dry running properties, which are introduced into the rolling bearing arrangement (1, 26, 36, 37, 31, 34) to support the primarily radially acting force components.

21. The rolling bearing arrangement (1, 26, 36, 37, 31, 34) as in claim 20, characterized in that sliding inlays or sliding elements (27, 33) or sliding rings (38, 39) or sliding ring segments (35) are covered or coated with an overlay of material that alters the sliding friction, or inhibits the sliding friction, or increases the sliding friction.

22. The rolling bearing arrangement (1, 26, 36, 37, 31, 34) as in claim 21, characterized in that the material overlay altering the sliding friction is alternatively applied to at least one of the relatively rotatable mounting or connecting elements (2, 3, 10, 11), particularly in the form of a coating.

23. The rolling bearing arrangement (1, 26, 36, 37, 31, 34) as in claim 1, characterized in that in regions in which dynamic sliding friction occurs, the radial extent of the gap (4) is at least intermittently reduced to zero.

24. The rolling bearing arrangement (1, 26, 36, 37, 31, 34) as in claim 1, characterized in that the additional bearing for transmitting predominantly radially acting force components is embodied as single- or multi-row arrangement of segments or rings made of plastic or of fiber-reinforced plastic, and/or as a cage band or a plurality of cage bands, each of which receives nonferrous-metal, graphite, steel or ceramic elements embedded in the segment or ring.

25. The rolling bearing arrangement (1, 26, 36, 37, 31, 34) as in claim 1, characterized in that the additional bearing for transmitting predominantly radially acting force components comprises at least one needle bearing cage segment band or needle bearing ring, which receives needle rolling elements or needle rolling elements of nonferrous metal, graphite, steel or ceramic, which are embedded in the needle bearing cage segment band or needle bearing ring, wherein the individual axes of rotation of the needle rolling elements are aligned in the axial direction parallel to the axis of rotation at the (circle) center point (K) of the rolling bearing arrangement (1, 26, 36, 37, 31, 34).

26. The rolling bearing arrangement (1, 26, 36, 37, 31, 34) as in claim 1, characterized in that either the rolling elements (17, 18) arranged in the radially overlapping sections (5, 6) and provided to support primarily axial force components and/or rolling- or sliding-elements of the additional bearing for transmitting predominantly radially acting force components is/are each implemented as a single-piece rolling-element ring (49), ideally having a circular cross section, that revolves around the (circle) center point (K) of the rolling bearing arrangement (1, 26, 36, 37, 31, 34), or alternatively—for example for purposes of temperature equalization or ease of assembly—is implemented as consisting of at least two or more individual ring segments (50) of the same ring (49).

27. The rolling bearing arrangement (1, 26, 36, 37, 31, 34) as in claim 26, characterized in that the circumferential rolling-element ring (49) is implemented, or, alternatively, the individual ring segments (50) are implemented, as a steel ring, or as a gas-nitrocarburized steel ring, or as a brass or copper ring, or as a plastic ring, or as a plastic ring with fiber-reinforced material inlays or cores, or as a plastic ring with material components composed of graphite or PTFE, wherein the hardness of the rolling-element ring(s) (49) or ring segment(s) (50) is (i) lower than the surface hardness of surrounding mounting or connecting elements (2, 3, 10, 11), or (ii) lower than or only slightly higher than 50 HRC, wherein said rolling element ring (49) or said ring segments (50) optionally have one or more additional coatings.

28. The rolling bearing arrangement (1, 26, 36, 37, 31, 34) as in claim 1, characterized in that the additional bearing for transmitting predominantly radially acting force components comprises roller- or barrel-shaped rolling elements (17, 18, 40) each having rounded transitional regions (42, 43) between a lateral surface (41) and an end face (44, 45) of the rolling element.

29. The rolling bearing arrangement (1, 26, 36, 37, 31, 34) as in claim 1, characterized in that the additional bearing for transmitting predominantly radially acting force components comprises roller- or barrel-shaped rolling elements (17, 18, 40) rolling in the at least one raceway (19, 20) and having a lateral surface (41) (i) with a curvature (radius R) in its longitudinal direction, or (ii) at least on one side, with a convex curvature with respect to an axis (46) of symmetry or rotation of the said rolling element (17, 18, 40), wherein the geometry of the associated raceway (19, 20) includes a similar curvature (radius R), with the result that the contour of the lateral surface (41) of the associated roller- or barrel-shaped rolling element fits into the raceway contour of the particular raceway.

30. The rolling bearing arrangement (1, 26, 36, 37, 31, 34) as in claim 1, characterized in that the rolling elements (17, 18) in radially overlapping sections (5, 6) have mutually different diameters (D1, D2).

31. The rolling bearing arrangement (1, 26, 36, 37, 31, 34) as in claim 1, for mounting parts of a wind power plant to one another, wherein the rolling bearing arrangement (1, 26, 36, 37, 31, 34) is mounted between connecting surfaces (15, 16) of at least two relatively rotatable system parts, specifically on a rotor blade of the wind power plant, on the one side, and on a rotor hub of the wind power plant, on the other side.

* * * * *